United States Patent [19]
Balducci
[11] 3,981,164
[45] Sept. 21, 1976

[54] EXIT LOCK HAVING CASSETTE MECHANISM

[75] Inventor: Walter O. Balducci, New Britain, Conn.
[73] Assignee: Emhart Industries, Inc., Farmington, Conn.

[22] Filed: Mar. 24, 1975
[21] Appl. No.: 561,669

Related U.S. Application Data
[63] Continuation of Ser. No. 478,340, June 10, 1974, abandoned.

[52] U.S. Cl. .......... 70/92; 70/214; 70/436
[51] Int. Cl.² .......... F05B 65/10; B60R 25/02; F05B 39/04
[58] Field of Search .......... 70/92, 432, 433, 434, 70/436, DIG. 49; 200/61.67; 340/274 R

[56] References Cited
UNITED STATES PATENTS

| | | | |
|---|---|---|---|
| 649,087 | 5/1900 | Wade et al. | 70/214 |
| 1,394,475 | 10/1921 | Crosby | 70/436 |
| 2,854,838 | 10/1958 | Foster | 70/92 |
| 2,962,889 | 12/1960 | McConnell | 70/92 |
| 3,324,692 | 6/1967 | Welch | 70/92 |

*Primary Examiner*—Paul R. Gilliam
*Assistant Examiner*—C. F. Pietruszka
*Attorney, Agent, or Firm*—McCormick, Paulding & Huber

[57] ABSTRACT

An emergency exit lock of vertical rod type has an active case which contains a latch bolt retracting mechanism operable at all times by a panic-bar. A key-controlled cassette mechanism releasably retained in the active case cooperates with the latch bolt retracting mechanism to provide an additional lock operating function. The cassette mechanism may be assembled to provide a latch holdback function, to lock or disable and unlock or enable a manually operated outside operating member, or to unlock or enable an outside operating member normally maintained in locked or disabled condition when the key is removed.

33 Claims, 8 Drawing Figures

EXIT LOCK HAVING CASSETTE MECHANISM

This is a continuation of application Ser. No. 478,340 filed June 10, 1974 now abandoned.

BACKGROUND OF THE INVENTION

This invention relates in general to door locks and deals more particularly with improvements in exit locks of the type which have multiple operating functions and which may be adapted to a variety of different functions. The invention is particularly adapted to be practiced with emergency exit locks. Such locks have a latch bolt retracting mechanism at all times operable from the inner side of an associated door by a panic-bar, paddle lever or the like, for reasons of safety. However, in addition to the aforedescribed basic operating function, it is generally necessary that an emergency exit lock of the aforesaid type be provided with mechanism to enable other operating functions. It may, for example, be necessary to provide for retraction of one or more latch bolts from the outer side of the door by manually operable means, such as a knob or thumbpiece, mounted on the outer face of the door and which may be locked or which is normally maintained in locked condition and may be opened by a key. In some instances, it may be desirable to provide such a lock with a latch hold-back mechanism which retains the latch bolt or bolt units in retracted position so as not to interfere with opening and closing movements of the door. In any event, it is generally necessary that such an emergency exit lock be adaptable to a variety of different operating functions. Heretofore, it has been customary for the lock manufacturer to provide a basic exit lock assembly which includes parts to enable various operating functions. When the customer determines the desired lock functions, certain parts may be removed from the lock assembly or other parts may be substituted for parts in the basic assembly to adapt the lock to the desired function. The manufacture must often supply parts which the customer does not require. Further, the aforedescribed system generally requires that the lock be disassembled and then reassembled with required parts to attain a desired function, all of which requires a substantial degree of mechanical skill and introduces the possibility of error in reassembly. Occasionally, it may be necessary to change the function of an exit lock after it has been installed on a door. Such a change can usually be effected by the removal, addition or substitution of parts of the lock mechanism, however, the lock must generally be dismantled and reassembled, as aforedescribed.

It is the general aim of the present invention to provide an improved exit lock assembly which may be readily adapted to a variety of operational functions and which may be readily assembled to provide a desired function by one of ordinary skill.

SUMMARY OF THE INVENTION

In accordance with the present invention, an improved exit lock comprises a case supporting a latchbolt actuating member for movement between first and second positions respectively corresponding to projected and retracted positions of an associated latch bolt in response to movement of a manually operated member which provides one operating function. A key controlled cassette releasably retained in the case contains a connecting member movable between active and inactive positions and which cooperates with another member in its active position to enable another operating function.

DETAILED DESCRIPTION OF THE PREFERRED EMBODIMENTS

The present invention is illustrated with reference to the active case of an emergency exit of vertical rod type which has active and inactive cases adapted to be mounted on the inner face of a door and to support a horizontally disposed panic bar. The active case includes a base plate assembly adapted to be fastened to the door and a cover assembly detachably secured to the base plate assembly. The base plate assembly carries a latch bolt retracting mechanism connected by a pair of vertical rods to top and bottom latch units adapted to be mounted, respectively, adjacent upper and lower edges of a door. The cover assembly forms part of the operating unit for the lock and provides pivotal support for an inner operating lever connected to one end of the panic bar. The inner operating lever is at all times operable to effect retraction of latchbolts associated with the latch units when the panic bar is depressed. In accordance with the present invention, the active case has a cassette releasably secured thereto which contains mechanism for cooperating with the latchbolt retracting mechanism to provide an additional operating function and may, for example, be set up or loaded to provide a key operated latch holdback operating function or to lock an outer operating member such as a knob or thumbpiece, as will be hereinafter described.

Figure 1:
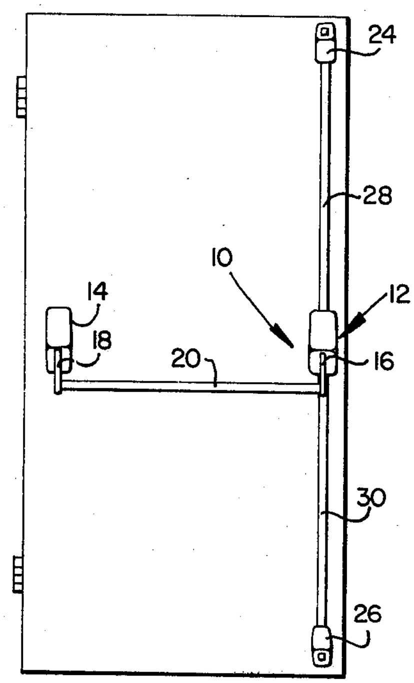
FIG. 1 is an elevational view of the inside face of a door having an emergency exit lock embodying the present invention mounted thereon.

Turning now to the drawings, an emergency exit lock illustrating the present invention and indicated generally by the reference numeral 10 in FIG. 1 is shown mounted on the inner face of an outwardly opening door. The exit lock 10 has an active case embodying the invention and indicated generally at 12 and also includes an inactive case 14. Levers 16 and 18, respectively, pivotally mounted on the active and inactive cases, support a horizontal panic bar 20 for pivotal movement toward and away from the door between projected and depressed positions. The inactive case 14 contains biasing mechanism (not shown) for urging the crossbar 20 toward its projected position, as is well known in the art, and will not be hereinafter further described. The active case 12 houses operating mechanism which includes a latch bolt actuating member or slide 22 operably connected to upper and lower bolt units, respectively indicated at 24 and 26, by vertical rods 28 and 30 supported on the face of the door for vertical movement relative thereto. The latch bolt actuating member 22 is at all times operable to retract latch bolts associated with the upper and lower latch units 24 and 26 in response to depression of the panic bar 20. More specifically, the actuating member 22 is supported for movement between first and second positions respectively indicated in full and broken lines in FIG. 3, and is at all times movable from its first to its second position in response to operation of the lever 16. Thus, the latch bolt 10 has an emergency exit function, that is, it may at all times be operated by the panic bar 20.

In accordance with the present invention, the active case 12 contains a cassette indicated generally at 32 and arranged to cooperate with the latch bolt actuating member 22 to provide an additional exit lock operating function. In the embodiment illustrated in FIGS. 1–5, the emergency exit lock 10 is arranged for operation from the outer side of the door by an outside operating member or thumbpiece 34. The cassette mechanism is controlled by a conventional key-operated lock cylinder 36 and is operable to disable or lock the thumbpiece 34, as will be hereinafter further discussed.

Figure 2:
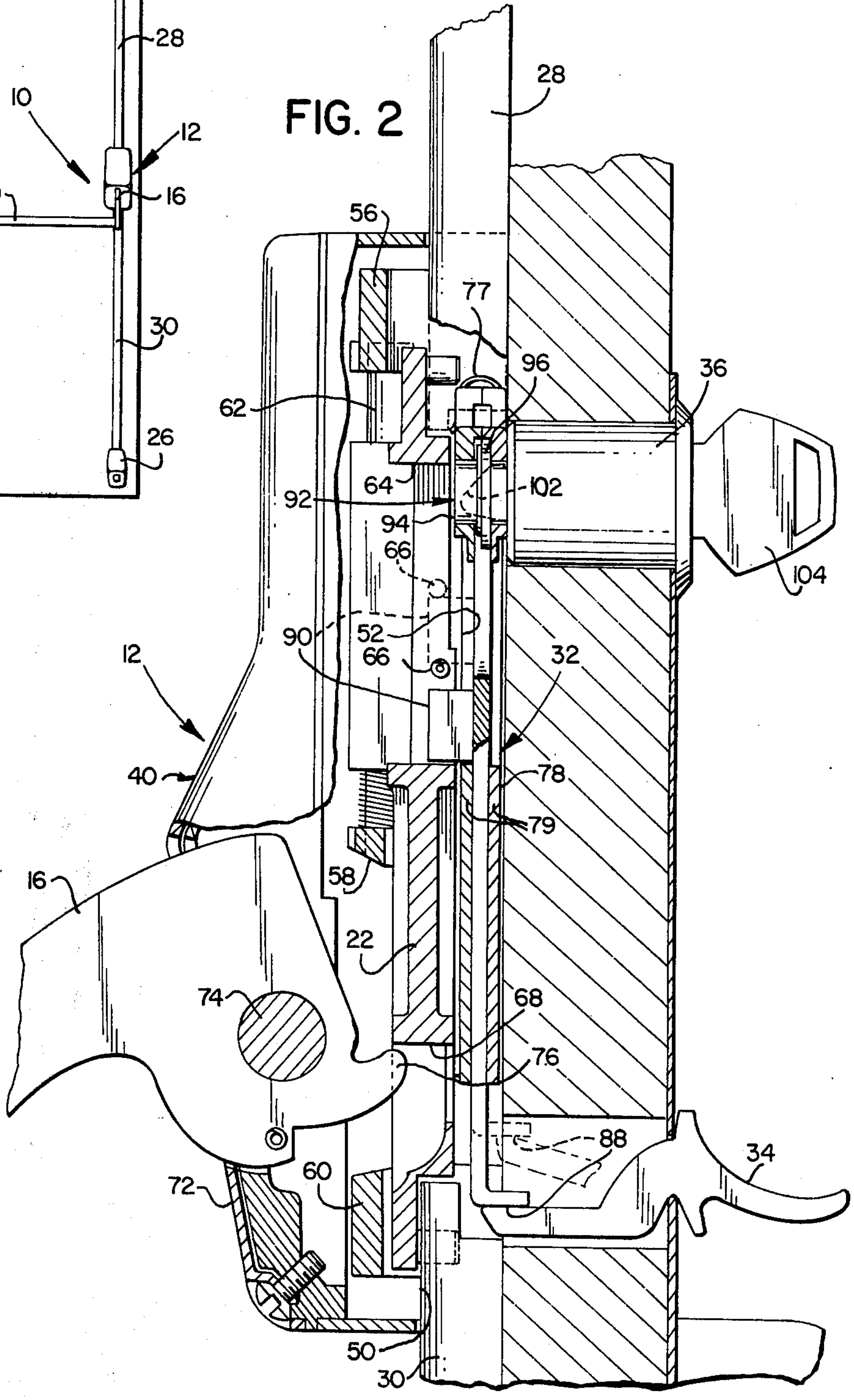
FIG. 2 is a somewhat enlarged fragmentary side elevational view of the active case and door assembly of FIG. 1, shown partially in vertical section.
Figure 3:
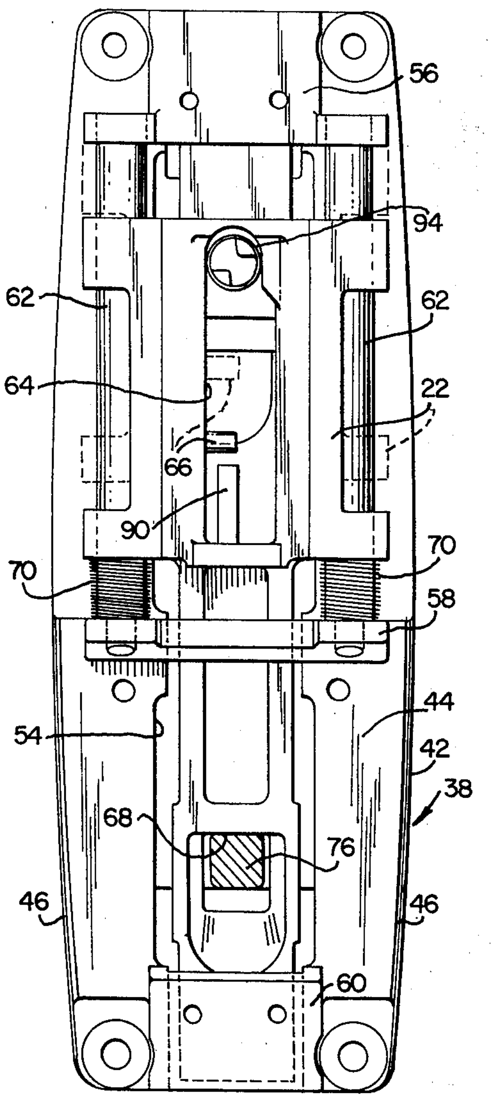
FIG. 3 is a front elevational view of the backplate assembly of the active case of FIG. 2 with the cover removed therefrom.
Figure 4:
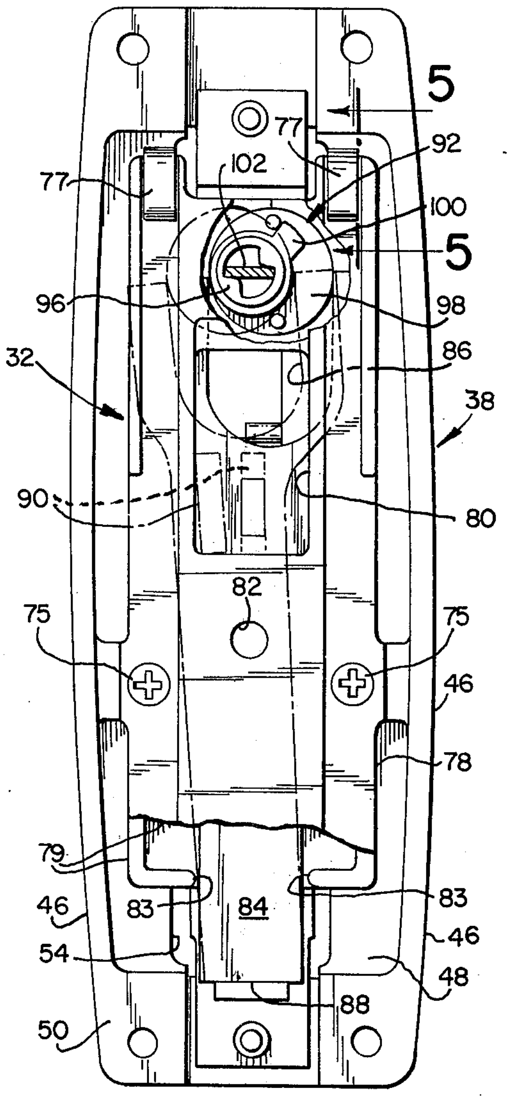
FIG. 4 is a rear elevational view of the backplate assembly of FIG. 3, portions of the cassette housing shown broken away to reveal mechanism therein.

As shown in FIGS. 2–4, the active case 12 includes a frame or back plate assembly indicated generally at 38 and a cover assembly designated generally by the numeral 40. The back plate assembly 38 includes a back plate 42 which preferably comprises a metal casting and has a front wall 44 and side walls 46, 46 which cooperate to define a rearwardly opening recess 48. A rearwardly facing mounting surface 50, surrounds the recess 48 for mounting engagement with the inner face of a door, as shown in FIG. 2. The front wall 44, defines a rearwardly facing mounting surface 52 at the forward end of the recess 48. A vertically disposed slot 54 formed in the front wall 44 divides the latter wall into two laterally spaced sections and communicates with the recess 48. Integral mounting brackets 56, 58 and 60 project forwardly from the front wall 44 to provide transverse connection between the two sections thereof, as best shown in FIG. 3. The brackets 56 and 58 carry a pair of spaced vertically extending parallel guide rods 62, 62 to support the slide 22 which is partially disposed within the vertical slot 54.

The upper portion of the slide 22 which receives the guide rods 62, 62 therethrough is generally rectangular and has a vertically disposed slot 64 which opens therethrough and communicates with the recess 48, as best shown in FIGS. 2 and 3. A pin 66 carried by the slide 22 projects from one side of the slide into the recess 64 and terminates near the center of the recess. The slide 22 further includes an integral depending tailpiece recessed near its lower end to define a downwardly facing abutment surface 68. The upper and lower ends of the slide 22 are respectively attached to the top and bottom rods 28 and 30 generally within the slot 54. The slide is biased downwardly by its own weight and the weight of the vertical rods 28 and 30 and parts of the bolt units 24 and 26 connected thereto. Light buffer springs 70, 70 mounted on the guide rods 62, 62 act between the mounting bracket 58 and the slide 22 to absorb operational shock. However, the springs 70, 70 are normally compressed, at least to some degree by the weight of the slide 22 and the elements connected to it.

The cover assembly 40 includes a cover 72 which is mounted on the base assembly 38 and carries the operating lever 16. The lever 16 is pivotally mounted on the cover by a shaft 74 and is also connected to the panic bar 20. At its inner end the lever 16 has a finger 76 which engages the abutment 68 on the slide for lifting the slide 22 and the rods 28 and 30 when the panic bar 20 is depressed to actuate the top and bottom latch units 24 and 26. The bottom latch unit 26 comprises a conventional unit which includes a latch bolt arranged to be retracted by lifting movement of the rod 30, as is well known in the art. The top latch unit 24 is of a type which includes an associated latch bolt retractable in response to upward movement of the top rod 28. A latch unit of the aforedescribed general type is illustrated and described in my U.S. Pat. No. 3,776,582 for "Latch Assembly," issued Dec. 4, 1973.

The cassette 32 is releasably retained in the recess 48 adjacent the mounting surface 52 by a pair of fasteners or screws 75, 75 which threadably engage the front wall 44, as best shown in FIG. 4. It has a generally rectangular hollow housing 78 formed by a pair of relatively thin mating half sections 79, 79 releasably retained in assembled relation by spring clips 77, 77. Each half section has a generally rectangular opening 80 therein and a cylindrical central aperture 82 located below the opening 80 as best shown in FIG. 4. A connecting member or lever 84 received in the housing is supported for pivotal movement about fulcrums 83, 83 defined by the cassette housing and best shown in FIG. 4 and is further arranged for vertical sliding movement relative to the cassette housing 78. The lever 84 has a yoke 86 at its upper end and an elongated stem which projects through an opening at the bottom of the cassette housing and defines a downwardly facing abutment surface 88 at its lower end disposed above and engageable with the forward end of the tailpiece 32. A lug 90 carried by the lever 84 projects forwardly from the lever through the aperture 80 in the housing front section 79 and into the opening 64 in the slide. The lever 84 is pivotally movable about horizontal axes between an active or full line position in FIGS. 3 and 4 wherein the lug 90 is disposed below and in vertical alignment with the pin 66 and an inactive position indicated by broken lines wherein the lug 90 is out of vertical alignment with the pin 66. A cam assembly indicated generally at 92 moves the connecting lever 84 between its active and inactive positions and comprises a pair of hubs 94 and 96 respectively journalled in the front and rear housing sections 79, 79, an eccentric cam 98 supported for limited rotation relative to the hubs and a lazy cam 100 non-rotatably connected to the hub 96. The lazy cam has a radially extending lug disposed between a pair of fence pins carried by the eccentric cam 98 to provide lost motion connection between the hubs and the eccentric cam. The hub 96 is arranged to be rotated by a conventional connecting bar 102 which forms an extension of the key plug of the lock cylinder 36, the key plug being operable from the outer side of the door by a suitable key such as indicated at 104. The connecting bar 102 has a generally rectangular cross section and is received in a butterfly slot in the hub 96 to provide a lost motion connection between the key plug and the cam assembly 92. The combination of the lost motion connection between the hub 96 and the cam 98 provided by the lazy cam 100 and the lost motion connection, between the key plug and the hub 96, provided by the butterfly slot permits the key 104 to be rotated through a full 360° in one direction in moving the lever 84 between its active to its inactive position. Coengageable abutment surfaces on the cassette housing 78 and the eccentric cam 98 limit rotation of the cam assembly 92 relative to the cassette housing. Thus, the key 104 may be turned through one full revolution, returned to its shed position and withdrawn from the lock, so that the thumbpiece 34 may be left in a disabled or locked condition or an unlocked or enabled condition depending upon the position in which the lever 84 is locked. When the lever 84 is in its inactive position, operation of the thumbpiece 34 causes vertical movement of the lever 84 without engagement of the lug 90 with the pin 66. Thus, the connection between the thumbpiece and the slide is disabled so that the thumbpiece cannot raise the slide 22 to operate the top and bottom latch units. However, the lever in its active position provides operable connection between the slide and the thumbpiece 34, so that operation of the thumbpiece causes the lug 90 to engage the pin 66 to move the slide from its first to its second position.

Figure 6:
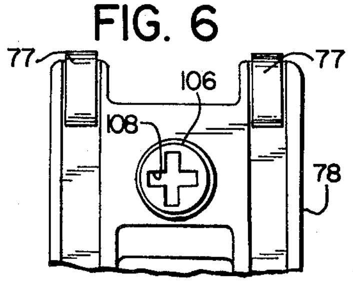
FIG. 6 is a fragmentary rear elevational view of another cassette and illustrates another embodiment of the invention.

It is sometimes desirable to provide a function wherein an outside operating member such as the thumbpiece 34 is automatically locked or disabled when the key is removed from the lock cylinder. This function may be readily attained by loading the cassette with a cam assembly which prevents a full rotation of the key in moving the lever 84 from its active to its inactive position. A typical cam assembly of the aforedescribed type is shown in FIG. 6 which includes a hub 106 provided with a cross slot 108 for positive drive connection with the connecting bar 102. This arrangement prevents the key 104 from being rotated through one full revolution in one direction to move the lever 84 from its inactive to its active position whereby to enable the thumbpiece 34. In order to return the key to its shed position, it must be rotated in a reverse direction which in turn causes the lever 84 to return to its inactive position. Thus, the key 104 cannot be withdrawn from the lock cylinder 36 while the thumbpiece 34 is in an enable condition.

Figure 7:
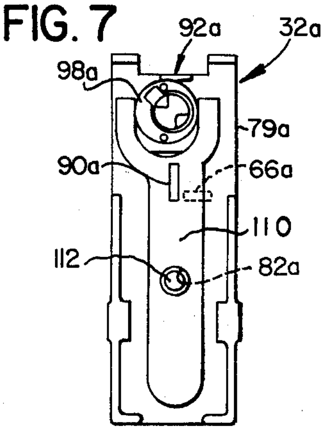
FIG. 7 is a somewhat reduced rear view of still another cassette shown with the rear cover removed therefrom and illustrating still another embodiment of the invention.
Figure 8:
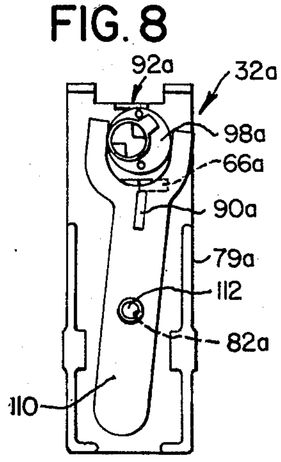
FIG. 8 is similar to FIG. 7 but shows the cassette mechanism in another position.
Figure 5:
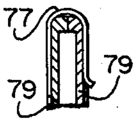
FIG. 5 is a fragmentary sectional view taken generally along the line 5—5 of FIG. 4.

In some installations it may be desirable that no means be provided for operating the latch bolt from the outer side of a door, but that provision be made for locking the latch bolt or bolts in retracted or holdback position so that the door may be freely movable between its open and closed positions at all times. In FIGS. 7 and 8 there is shown another embodiment of the invention particularly adapted to provide a latch holdback operating function. The illustrated cassette mechanism indicated generally at **32*a* is similar in most respects to the cassette mechanism 32** and parts thereof identical to parts previously described bear the same reference numeral and a letter "*a*" suffix and will not be hereinafter described in detail. Like the cassette mechanism 32, the cassette **32*a* includes a housing 78*a* formed by a pair of half sections 79*a* (one shown). However, the lever 110 differs from the previously described lever 84 in that it is substantially shorter and does not project from the bottom of the cassette housing. The lever 110 has a cylindrical aperture therethrough intermediate its ends to receive another member or a pivot pin 112, the opposite ends of which are of slightly reduced diameter and received within the apertures 82*a*, 82*a* in the housing half-sections 79, 79. Thus, the lever 110 is arranged for pivotal movement relative to the cassette housing between an inactive position shown in FIG. 7 and an active position illustrated in FIG. 8. When the slide is in its first or lower position, the pin 66*a* is laterally aligned with a side of the lug 90*a*, which prevents the lever 110 from pivoting to its active position. Thus, the pin 66*a* and the lug 90*a* cooperate to disable the key controlled mechanism which conditions the cassette. However, when the slide is moved to its second or bolt retracting position, as by operation of a panic bar or the like, the lever 110 may be shifted to its active position, as it appears in FIG. 8. In the active position the lug 90*a* is positioned below the pin 66*a* to retain the slide in its raised or latch bolt retracting position. The cam assembly 92*a* is substantially identical to the cam assembly 92, previously described, and provides for lost motion connection between the eccentric cam 98*a*** and an associated key-controlled lock cylinder so that the key may be removed from the lock cylinder when the cassette mechanism is locked in a latch holdback condition.

I claim:

1. In an exit lock having a case, a latch bolt actuating member, means supporting said actuating member in said case for movement between first and second positions respectively corresponding to projected and retracted positions of an associated latch bolt, and manually operable first means for moving said actuating member from said first to said second position to enable one lock operating function, the improvement comprising a cassette supported in fixed position in said case and having a housing and a connecting member supported in said housing for movement relative thereto between active and inactive positions, said connecting member having a part thereof exposed externally of said housing for engagement with said actuating member when said connecting member is in its active position, means for releasably securing said cassette in assembly with said case, another member for cooperating with said connecting member in its active position to enable another lock operating function, and manually operable second means for moving said connecting member between its active and inactive positions.

2. The combination as set forth in claim 1 wherein said connecting member comprises a lever supported for pivotal movement between said active and inactive positions.

3. The combination as set forth in claim 2 wherein said manually operable second means comprises a hub journalled for rotation on said housing and a cam associated with said hub and engageable with said lever.

4. The combination as set forth in claim 3 wherein said actuating member is supported for rectilinear movement between said first and second positions and said hub is journalled for rotation about an axis extending transversely of the direction of movement of said actuating member.

5. The combination as set forth in claim 3 wherein said lever includes a yoke and said cam is engageable with said yoke.

6. The combination as set forth in claim 3 wherein said manually operable second means includes means providing lost motion connection between said hub and said cam.

7. The combination as set forth in claim 1 wherein said other member comprises a part of said cassette.

8. The combination as set forth in claim 7 wherein said connecting member comprises a lever, said other member comprises a pivot pin supporting said lever for pivotal movement about an axis fixed relative to said housing, and said lever in its active position retains said actuating member in its second position.

9. The combination as set forth in claim 8 wherein said manually operable second means comprises a hub journalled for rotation on said housing, a cam associated with said hub and engageable with said lever, and a key controlled lock mechanism drivingly engaging said hub.

10. The combination as set forth in claim 9 including means enabling removal of the key from said key controlled lock mechanism when said lever is in its active position.

11. The combination as set forth in claim 10 wherein said enabling means comprises means providing lost motion driving connection between said key controlled lock mechanism and said cam.

12. The combination as set forth in claim 1 wherein said other member comprises a manually operable third means for moving said connecting member from one to another position, said connecting member in its active position providing operable connection between said third means and said actuating member to move said actuating member from its first to its second position in response to operation of said third means, said connecting member in its inactive position being out of connecting relation with said actuating member and movable relative to said actuating member in response to operation of said third member.

13. The combination as set forth in claim 12 wherein said connecting member comprises a lever supported for pivotal movement from its inactive to its active position.

14. The combination as set forth in claim 13 wherein said lever is supported for movement from its one to its other position in a direction generally normal to its axis of pivotal movement from its inactive to its active position.

15. The combination as set forth in claim 13 wherein said lever is supported for pivotal movement about a fulcrum defined by said housing.

16. The combination as set forth in claim 13 wherein said manually operable second means comprises a hub journalled for rotation on said housing, a cam associated with said hub and engageable with said lever, and a key controlled lock mechanism drivingly engaging said hub.

17. The combination as set forth in claim 16 including means enabling removal of the key from said key controlled lock mechanism when said lever is in its active position.

18. The combination as set forth in claim 17 wherein said enabling means comprises means providing lost motion driving connection between said key controlled lock mechanism and said cam.

19. The combination as set forth in claim 16 including means for preventing removal of said key from said lock mechanism while said lever is in its active position.

20. The combination as set forth in claim 19 wherein said preventing means comprises means for preventing one full rotation of said key in moving said lever from its inactive to its active position.

21. The combination as set forth in claim 20 wherein said preventing means comprises means providing positive drive connection between said lock mechanism and said hub.

22. The combination as set forth in claim 1 wherein said case includes a backplate having a rearwardly opening recess therein and a rearwardly facing mounting surface generally surrounding said recess for mounting engagement with the inner face of an associated door, said actuating member comprises a slide supported on said backplate for vertical sliding movement relative thereto, said manually operable first means comprises an inside operating lever supported for pivotal movement about a generally horizontal axis and at all times operable to move said slide from its first to its second position, and said cassette is received and supported in said recess.

23. The combination as set forth in claim 22 wherein said other member comprises a manually operable outside operating member, said connecting member in its active position providing operable connection between said outside operating member and said slide to move said slide from its first to its second position in response to operation of said outside operating member, said connecting member in its inactive position being movable independently of and relative to said slide in response to operation of said outside operating member.

24. The combination as set forth in claim 23 wherein said connecting member comprises a lever supported for pivotal movement between its active and inactive position.

25. The combination as set forth in claim 12 wherein said manually operable third means comprises a thumbpiece supported for pivotal movement about a horizontal axis fixed relation to said case.

26. The combination as set forth in claim 22 wherein said connecting member comprises a lever, said other member comprises a pivot pin supporting said lever to pivot about an axis fixed relative to said housing, and said lever in its active position releasably retains said slide in its second position.

27. The combination as set forth in claim 1 wherein said housing comprises two parts and means for releasably retaining said two parts in assembled relation when said cassette is removed from said case.

28. The combination as set forth in claim 27 wherein said retaining means comprises a spring clip.

29. In an exit lock having a case, a latch bolt actuating member, means supporting said actuating member in said case for movement between first and second positions respectively corresponding to projected and retracted positions of an associated latch bolt, and manually operable first means for moving said actuating member from said first to said second position to enable one operating function, the improvement comprising a cassette supported in fixed position in said case and supporting a connecting member for movement relative thereto between active and inactive positions, said connecting member having a part thereof engageable with said actuating member when said connecting member is in its active position, means for releasably securing said cassette in assembly with said case, another member for cooperating with said connecting member in its active position to enable another operating function, and manually operable second means for moving said connecting member between its active and inactive positions.

30. The combination as set forth in claim 29 wherein said manually operated first means comprises an inside operating member at all times operable to move said actuating member from its first to its second position, said other member comprises an outside operating member for cooperating with said connecting member in its active position to move said actuating member from its first to its second position, and said manually operable second means comprises a key controlled lock mechanism.

31. The combination as set forth in claim 30 wherein said outside operating member comprises a thumbpiece and said connecting member in its inactive position is movable relative to said actuating member in response to movement of said thumbpiece.

32. The combination as set forth in claim 29 wherein said connecting member comprises a lever, said other member comprises a pivot pin carried said cassette and supporting said lever for pivotal movement about an axis fixed relative to said case, and said lever in its active position retains said actuating member in its second position.

33. The combination as set forth in claim 32 wherein said manually operable second means comprises a key controlled lock mechanism.

* * * * *

UNITED STATES PATENT OFFICE

CERTIFICATE OF CORRECTION

Patent No. 3,981,164 Dated September 21, 1976

Inventor(s) Walter O. Balducci

It is certified that error appears in the above-identified patent and that said Letters Patent are hereby corrected as shown below:

Column 2, line 32, after "exit" insert --lock--.

Column 6, line 10, after "controlled" insert --lock--.

Claim 1, column 6, line 44, delete "lock".

Signed and Sealed this

Twenty-third Day of November 1976

[SEAL]

*Attest:*

RUTH C. MASON
*Attesting Officer*

C. MARSHALL DANN
*Commissioner of Patents and Trademarks*